UNITED STATES PATENT OFFICE.

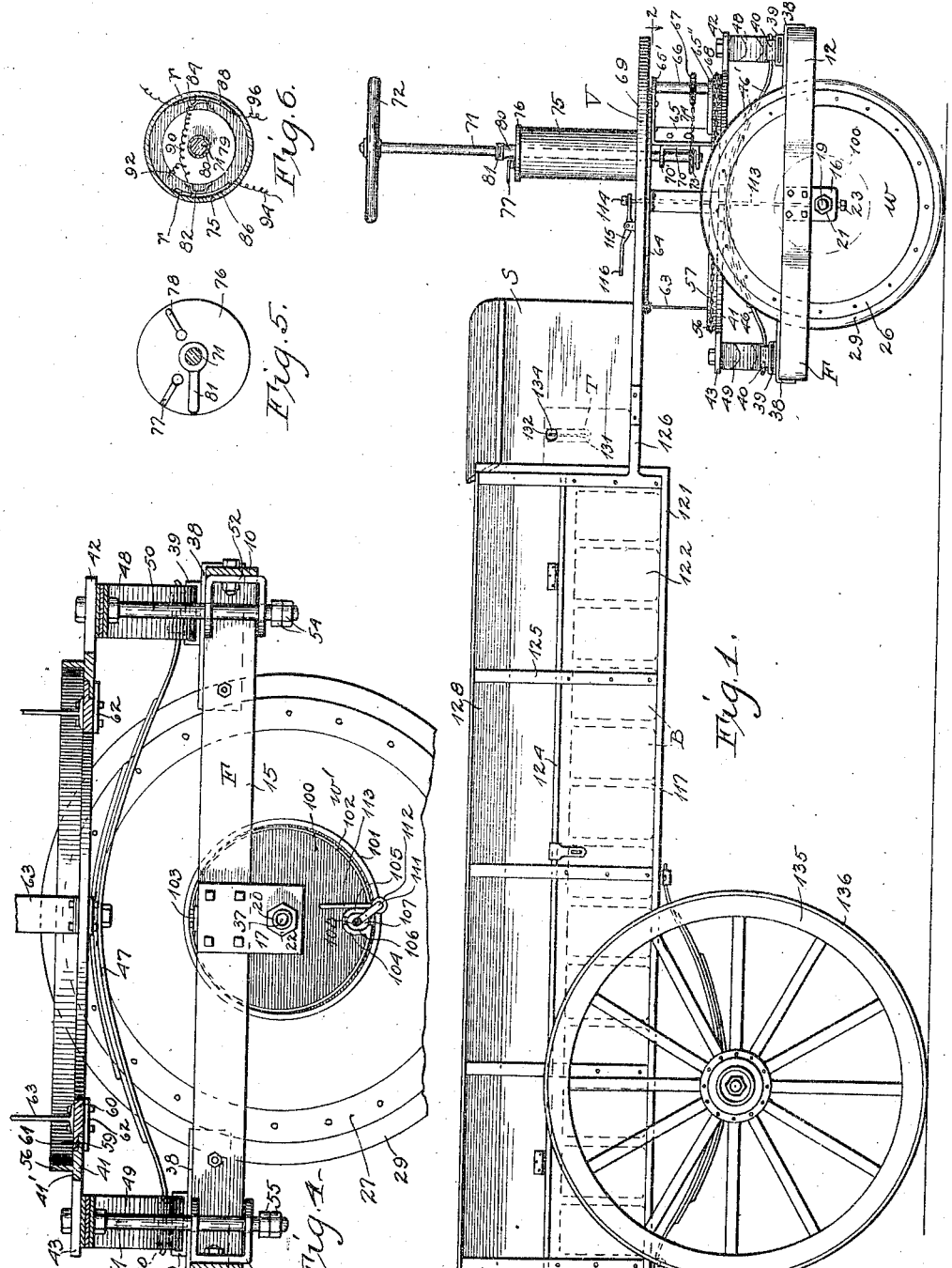

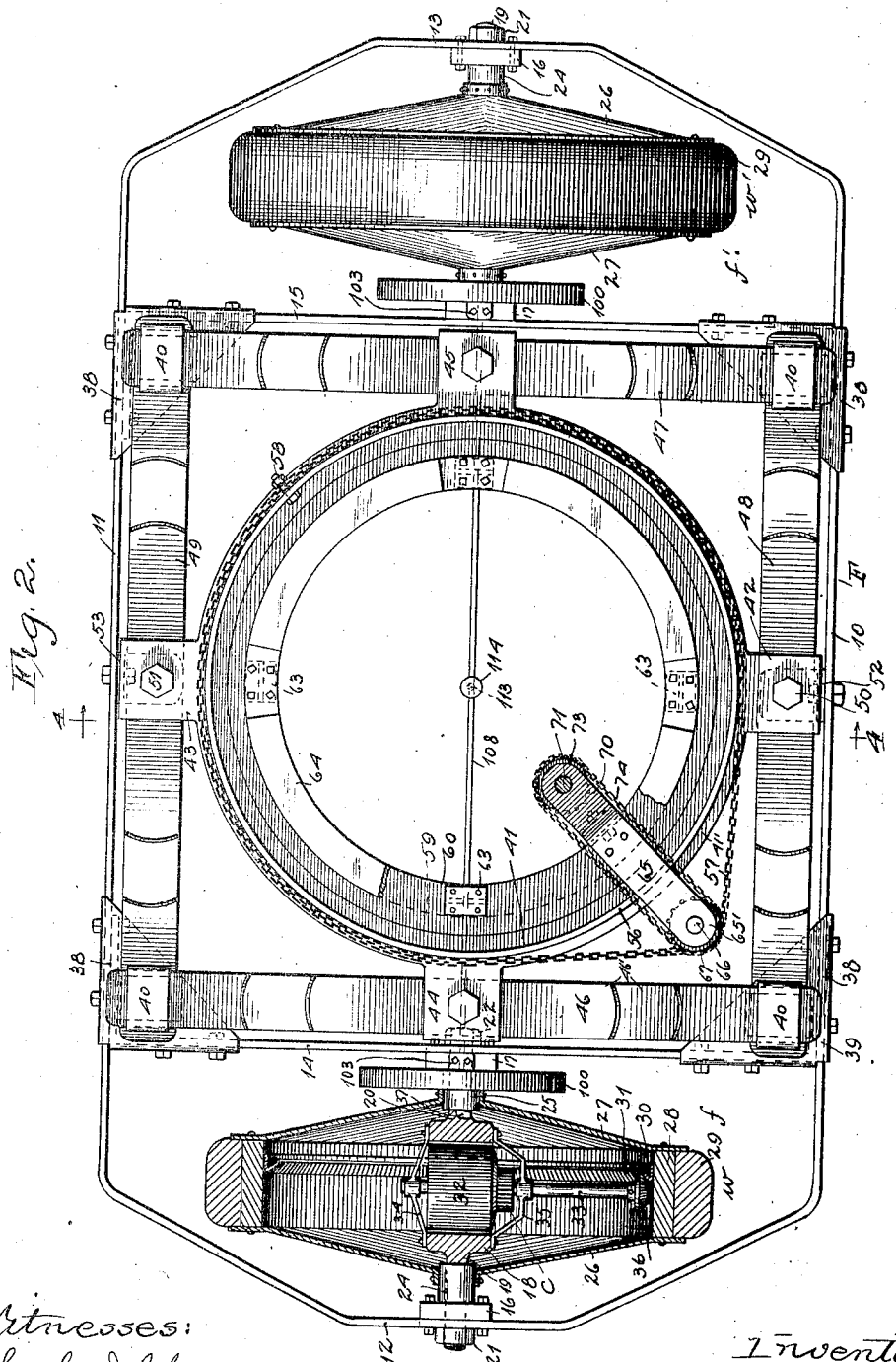

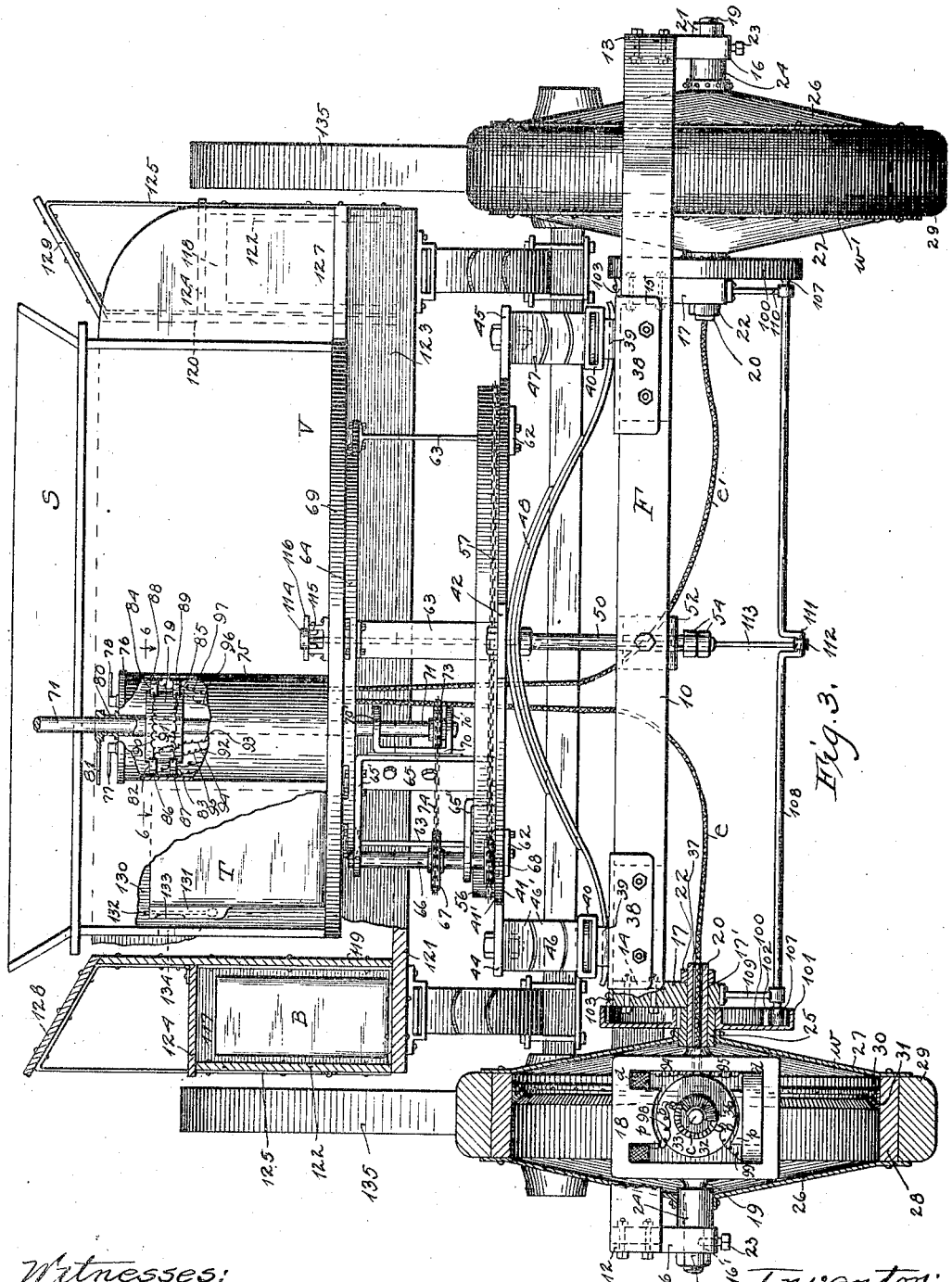

RODERICK MACRAE, OF CHICAGO, ILLINOIS.

ELECTRIC VEHICLE.

1,038,615.  Specification of Letters Patent.  Patented Sept. 17, 1912.

Application filed February 13, 1911. Serial No. 608,333.

*To all whom it may concern:*

Be it known that I, RODERICK MACREA, a subject of the King of England, residing at Chicago, in the county of Cook and State of Illinois, have invented certain new and useful Improvements in Electric Vehicles, of which the following is a specification.

My invention relates to electric vehicles, particularly to that class known as auto trucks, and contemplates improved features of construction, arrangement, and operation.

Among the important objects of my invention are to provide a unitary steering truck or chassis mounted on individually power driven wheels; to provide a rigid main supporting frame for such chassis and to engage such frame with both sides of the driving wheels in order that the load will be evenly distributed on the wheels to prevent deflection, distortion and unequal strains on the wheels; to provide an annular frame structure to be rigidly secured to the front end of a vehicle and to repose between such frame and the main supporting frame of the chassis; to provide improved arrangement of springs which will sustain heavy loads, yet which will be at all times resilient, flexible and yielding to protect both the load and the driving wheels; to provide mechanism for preventing distortion and displacement of the springs and to confine them to their proper fields of operation; to provide improved flexible steering mechanism controllable from the operator's seat to bodily turn the chassis frame; to provide improved electrical controlling mechanism adjustable by the operator to cause independent operation of the steering wheels to automatically rotate the chassis frame when the vehicle is to be turned whereby short and quick turns may be made under heavy load independently of physical exertion on the part of the operator; to provide improved arrangement of housing and inclosure for storage batteries for supplying the driving energy; and in general to provide improved electric propulsion mechanism for commercial vehicles which is very simple and comparatively light, yet which is very powerful and particularly adaptable for propulsion of heavy loads and for the manipulation of vehicles under heavy load.

The various features of my invention are clearly illustrated in the accompanying drawings.

In these drawings Figure 1 is a side elevational view of a vehicle embodying the various features of my invention, Fig. 2 is an enlarged plan view of the chassis part looking from plane 2—2, Fig. 1, one of the wheels being in diametral section, Fig. 3 is an enlarged front view of the vehicle, one of the wheels and other parts being in section, Fig. 4 is a sectional view taken from plane 4—4, Fig. 2, Fig. 5 is a top view of the controller mechanism, and Fig. 6 is a sectional view taken on plane 6—6, Fig. 3.

The main supporting frame F of the chassis part is of oblong contour and may be built of I-beams, channel beams, etc., or of flat bands, as shown, and comprises front and rear sections 10 and 11, the side sections 12 and 13, and the intermediate transverse sections 14 and 15 adjacent the side sections. Between the intermediate sections and the side sections the compartments $f$ and $f'$ are formed for accommodating the wheels $w$ and $w'$, while on the frame between the intermediate sections the various supporting and controlling mechanisms for the vehicle are disclosed. The wheels $w$ and $w'$ are of identical construction, and their arrangement, support and control with reference to the frame F are also alike, and the description need therefore be only with reference to one of the wheels. As shown in Figs. 3 and 4, blocks 16 and 17 extend downwardly from the centers of the side and transverse parts 12 and 14 respectively, these blocks at their upper ends being rigidly secured to the respective frames by bolts or otherwise. The blocks serve to support between them and in the compartment $f$ a field frame 18 for an electric motor for driving the wheel. The field frame may be of any suitable construction, and as shown, it is rectangular in form, and from its sides extend trunnions 19 and 20 which pass through openings 16' and 17' in the blocks 16 and 17 respectively, the outer ends of the trunnions being threaded and engaged by nuts 21 and 22 respectively. To prevent rotation of the trunnions a field frame and set screw 23 extends through either one or both the blocks and into the trunnion. The field frames of the wheels are thus rigidly connected to the frame F. Between the field frame and blocks the trunnions pivot hubs 24 and 25 which bear the wheel sides 26 and 27. These sides may be spokes or in the form of sheet metal caps, as shown. The sides at their outer periphery are secured to the rim 28 of the wheel and project beyond this rim to hold in place thereon the tire 29, which may be of any construction, either solid or pneumatic. To the inner side of the rim 28 is secured a ring 30 having a beveled gearing surface 31. Between the poles $p$ of the field frame is the armature 32 mounted on the armature shaft 33, which bears in brackets 34 and 35 supported from the field frame, the end of the armature mounting the bevel driving pinion 36 which meshes with the gear surface 31 of the ring 30. The commutator $c$ on the armature shaft is engaged by brushes $b$ mounted in any suitable manner. The field poles $p$ are provided with field windings $d$. Under suitable current conditions and circuit connections the armature will be rotated within its stationary field and the wheel frame will be rotated and the vehicle propelled. The inner trunnion 20 has the longitudinal passageway 37 for accommodating the cable $e$ comprising the various circuit conductors for the motor. Likewise, the cable $e'$ enters through the inner trunnion of the wheel $w'$ for supplying the necessary conductors for carrying current to the motor in said wheel. It is thus apparent that each wheel has bearing at both sides on the rigid frame F and that any weight on the wheel will be evenly distributed thereon and will not be centered at one side thereof, as is the case in the prior art, where the wheel is journaled on a stud axle whose inner end is swiveled to the machine frame to be swung with the wheel in horizontal direction, wheels thus attached having a tendency to become inclined from the vertical. In my arrangement the wheels must remain in true vertical position, which is the only position in which the wheels can withstand heavy strains without becoming distorted or otherwise injured.

The mechanism intervening between the frame F and the vehicle to be propelled is clearly shown in the various figures. Spanning each of the corners at the junctures of the front and rear frame parts 10 and 11 and the intermediate transverse frame parts 14 and 15 is a plate 38 rigidly secured to the frame parts as by bolts or other suitable means, these plates acting as corner braces for strengthening the frame F and also as supporting surface for the spring mechanism. Each plate carries a lower longitudinal sleeve or guide block 39 and an upper transverse sleeve or guide block 40. These sleeves may be separate devices secured together and to their supporting plate or the sleeves and plate may be parts of an integral casting. An annular frame or plate 41 is disposed centrally between the frame parts 10, 11, 14 and 15, and has front and rear projections 42 and 43 respectively and the side projections 44 and 45 respectively, the projections being ninety degrees apart. Rigidly bolted or otherwise secured at its center to the extension 44 is a semi-elliptical spring 46 which may be built up of a number of leaves 46', the ends of the lower leaf passing through the front and rear upper guide sleeves 40 at the left side of the frame, these ends being freely slidable in these sleeves as the spring is compressed. Likewise, a similar semi-elliptical spring 47 is secured at its center to the extension 45 and extends transversely between the frame parts 10 and 11 with the ends of its lower leaf slidable in the upper sleeves 40 at the right side of the frame F. In the same manner, semi-elliptical springs 48 and 49 are secured at their centers to the extensions 42 and 43 respectively and extend longitudinally with the ends of their lower leaves slidable in the opposite lower sleeves 39 at the front and rear respectively of the frame. The side springs 46 and 47 are just within the frame parts 14 and 15, and the front and rear springs are just within the frame parts 10 and 11 respectively, as indicated. As best shown in Fig. 4, the bolts 50 and 51 which rigidly secure the springs 48 and 49 to the extensions 42 and 43 respectively are extended downwardly and slidably through the limbs of U-frames 52 and 53 respectively, which frames are pivotally secured to the front frame parts 10 and 11, lock nuts 54 and 55 being secured to the lower ends of the bolts to limit the upward travel of the annular frame or circle 41 with reference to the frame F. The bolts are freely slidable through the U-frames to allow unhindered vertical working of the springs. These bolts also tend to prevent lateral displacement between the frames F and 41.

An annular vertical flange 56 extends upwardly on frame 41 and is concentric therewith, its flange being encircled by a chain 57 anchored thereto at 58, the chain being supported by the annular shelf part 41' of the frame 41 outside of the flange. As best shown in Fig. 4, the inner annular section of the frame 41 is cut down to form the annular shelf 59, and within this frame 41 and concentric therewith is the annular frame or plate 60 whose outer annular section 61 is undercut to receive the shelf 59. This frame 60 is rotatable within and on the frame 41 and is held in place by plates 62 secured thereto and lapping over and against the under side of the shelf 59, as indicated. Secured to and extending upwardly from the frame 60 at suitable intervals are posts 63 which may be short sections of I-beams, and secured to the tops of these posts and concentric with the frames 41 and 60 is the upper annular frame or circle 64 which is secured to the vehicle in any suitable manner. Thus, the frames 60 and 64 secured together by the posts 63 form a rigid annular frame which is rigidly secured to the vehicle and about which the frame F with the frame 41 and other parts supported thereon may revolve.

A U-bracket 65 extends radially between the frames 64 and 41, its upper horizontal limb 65' being anchored to the frame 64 in any suitable manner, as by means of bolts, and the lower limb 65'' is anchored in any suitable manner to the frame 41, these limbs extending outwardly beyond the flange 56, the lower limb 65'' being given an intermediate bend, as indicated, in order to clear the flange. Journaled in the outer ends of these limbs is the vertical shaft 66 carrying between the limbs a sprocket wheel 67 and at its lower end the sprocket wheel 68. Over this lower sprocket wheel passes the chain 57 already referred to, so that by turning of the shaft 66 the chain will be drawn over the sprocket wheel and the frame 41 with the frame F revolved about the upper frame secured to the vehicle. The shaft 66 may extend upwardly through the floor 69 of the platform V and be there provided with a hand wheel. This might, however, bring the hand wheel in an undesirable position with reference to the vehicle seat S, and means are therefore provided for bringing the steering apparatus in more desirable position on the vehicle. Accordingly, a second U-frame 70 is secured at its back to the back of the U-frame 65, and it has limbs 70' extending inwardly toward the center of the annular frames, and in these limbs is journaled the vehicle steering wheel shaft 71, this shaft terminating at its upper end in a steering wheel 72, as indicated in Fig. 1. Between the limbs of this U-frame and in line with the sprocket wheel 67 the shaft carries the sprocket wheel 73, and a chain belt 74 passes about both sprocket wheels, so that turning of the steering wheel will be communicated to shaft 66 and to chain 57 to turn the circle 41 and the frame F.

Referring to Figs. 1, 3, 5 and 6, the steering wheel shaft is encircled by a cylindrical shell or casing 75 which accommodates the circuit switches and other circuit controlling mechanism. The cover 76 of the casing is shown in mounting levers 77 and 78, and these levers may connect with circuit controlling mechanism within the casing. One circuit controlling mechanism may control the connection of the source with the motor circuits, and the other may control the amount of current, but as such mechanism may be of any well-known type it was not deemed necessary to show it. However, in addition to this ordinary circuit controlling mechanism I provide other circuit controlling mechanism, by means of which the motors of the chassis may be controlled to drive the wheels to automatically perform steering. This is very desirable, as heavily loaded wagons must at times make very sharp turns, as when backing up to deliver, or as when turning out of ruts or tracks. Under a heavily loaded vehicle it would of course require very great power on the steering wheel if the turning of the chassis were to be accomplished by the operator. I, however, provide for at will modifying the current flow through the motor of one wheel so that during turning one motor will slow up or cease to drive while the wheel of the other motor will operate, and this arrangement will cause the chassis to be powerfully turned by the power wheels themselves in accordance with adjustments by the operator, so that the vehicle under the heaviest loads can perform sharp and quick turns. Referring to Figs. 3, 5 and 6, a drum 79 within the casing 75 is mounted on a sleeve 80 encircling the steering wheel shaft 71 and terminating above the cover of the shell and there provide with a handle 81. From one side of the drum extend contact spring members 82 and 83, and from the opposite side of the drum extend contact spring members 84 and 85. Secured to the inner side of the shell but insulated therefrom are contact bars 86, 87, 88 and 89 for contacting with the spring members 82, 83, 84 and 85 respectively upon turning of the drum. The bars 86, 87 and 88, 89 are on opposite sides of the shell. Spring members 82 and 84 are connected together by a conductor 90, and contacts 83 and 85 are connected together by a conductor 91, conductors 92 and 93 leading respectively from conductors 90 and 91 and connecting with ordinary circuit controlling mechanism and with a source of current. Contact bars 86 and 87 connect through conductors 94 and 95 which extend through the cable e leading to the motor in wheel w, while conductors 96 and 97 connect with bars 88 and 89 respectively and pass through cable e' of the motor in wheel w'. As shown in wheel w in Fig. 3, the motors are of the series type, the conductor 94 connecting with the upper field frame d which then connects with the upper brush through conductor 98, the lower brush being connected through conductor 99 with the lower field coil which is connected with the conductor 95.

Referring to Figs. 3 and 6, suppose that the vehicle is run along normally,—that is, both motors operating. The lever 81 will then be in neutral position and the drum contacts will be in engagement with the contact bars near the inner ends thereof. Suppose now that it is desired to turn to the left. The operator will swing the lever 81 forwardly to cause rotation of the drum to disconnect contact members 84 and 85 from the bars 88 and 89 to cut out the motor in the left wheel w', the contact springs 82 and 83 moving along the contact bars 86 and 87 but not breaking contact therewith. The motor in wheel w is then operating and the motor in wheel w' is then idle, the result being that the frame F will be rotated and the vehicle turned to the left. If it is desired to turn to the right the lever 81 is swung rearwardly so that contact springs 82 and 83 will become disconnected from the bars 86 and 87 and the springs 84 and 85 moved farther along the bars 88 and 89, and the left motor will then be driving and the right motor idle, and the chassis frame will be rotated and the machine turned to the right. The operator therefore does not have to exert any force whatever on the steering wheel except to follow the movements thereof upon turning of the chassis by the motors. Short turns can therefore be quickly made with great power, which, as before stated, is very desirable in the operation of commercial vehicles.

When the vehicle is to be turned from a state of rest the practical way would be of course to first set the switching mechanism just described before the current is turned on. It will often happen, however, that it will be necessary to turn the vehicle with full current on, and sudden rupture of either motor circuit would then of course produce sparking and might be injurious to the motors. To overcome this, the inner end sections r of the bars may be of resistance material, such as carbon. With this arrangement, when full current is on and the lever 81 moved the spring contacts for the motor to be cut from circuit will engage with the carbon extension, and sufficient resistance gradually introduced into the circuit so that when the circuit is finally broken very little sparking will occur. With this arrangement it is unnecessary to entirely disconnect a motor, as by moving its circuit controlling contact members along the resistance extensions the current will be more or less diminished and the speed of the motor more or less reduced. Very fine and powerful control of the vehicle is therefore provided, and short and quick turns under very heavy loads can be controlled by the motor wheels themselves without requiring any exertion whatever on the part of the operator, the operator, however, having such turning operation by the motors under his complete control. Such automatic turning of the vehicle by the wheels can of course be accomplished whether the vehicle be going in forward or reverse direction, one of the switch mechanisms 77, 78 being adapted to reverse the direction of current flow from the source to the motors.

I also provide brake mechanism by means of which both driving wheels may be simultaneously braked. As shown most clearly in Figs. 3 and 4, the inner hub of each wheel has keyed thereto a brake wheel 100 having the rim 101, and within this wheel a brake band 102 is inserted, the brake band being supported from its other end from a bracket extension 103 secured to the top of the inner block 17. The free ends of the band outside the bracket 103 have semi-elliptical radial extensions 104, 105 forming between them an elliptical pocket 106. In this pocket of each wheel an elliptical plug 107 is inserted, which in its normal position allows the band ends to come together to thus remove the band from the brake wheel rim, but when the plug is turned the band ends are spread apart and the band brought into frictional engagement with the brake wheel rim to thus brake the wheels.

The blocks are connected together by a shaft 108 journaled at its ends in brackets 109, 110 extending downwardly from the inner blocks 17 adjacent the two wheels. At a central point this shaft has a crank section 111 engaged by the head 112 of a rod 113 which extends vertically upwardly and centrally through the various annular frames and which terminates above the floor 69 of the vehicle platform, in a head or knob 114. Referring to Figs. 1 and 3, a foot lever 115 forks at its front end about the rod 113 below the knob 114, and the rear end 116 of this lever expands to form a foot plate. With this arrangement pressure on the foot plate will raise the front end of the lever to draw the rod 113 upwardly, which will result in rotation of shaft 108 on account of the crank connection, and in rotation of the elliptical plugs to expand the friction bands. The rod 113 passing centrally through the annular supporting frames of the chassis, the brake mechanism will not interfere with the free turning of the chassis, while at the same time the brake mechanism may at any time be actuated.

The current source for the motors is preferably in the form of storage batteries, and I provide improved arrangement for accommodating such storage batteries. In prior electric vehicles the batteries are massed together either in front or at the rear of the vehicle, and in such positions that it is very hard to get at them for inspection. As illustrated in the drawings, I accommodate the batteries in compartments 117 and 118 running longitudinally along the sides of the vehicle body. To form these compartments the sides 120 of the vehicle body are set inwardly a distance from the side edges of the vehicle floor 121, and outer walls 122 extend upwardly from the sides of the floor, these outer walls and the sides of the vehicle body forming the side walls of the compartments and the vehicle floor forming also the floor of the compartments. A front wall 123 extends across the front of the vehicle behind the operator's platform and closes the front ends of the battery compartments. The rear ends of these compartments are also closed. The batteries are set in a row in each compartment and are accessible from the top, each compartment being normally closed by a lid 124 hinged to the vehicle side wall. As a means for strengthening the compartment walls and also the vehicle sides metallic frames 125 are secured at intervals to the walls, and to the vehicle floor, and bracket extensions 126 and 127 extend forwardly from the front frames and are secured to the sides of the operator's platform 69, as best shown in Figs. 1 and 3. The upper ends of the frames are inclined, as shown, and support the fly boards 128 and 129 of the vehicle body. Batteries may also be placed in the compartment 130 formed below the operator's seat S. One such cell T is shown, this cell being a test or pilot cell whose receptacle has a pouch or pocket 131 at its side for receiving a hydrometer 132 visible from the exterior through the transparent section 133 of the pocket and through the side opening 134 formed in the side of the seat frame. The operator can thus at any time observe the reading on the hydrometer and ascertain the condition of the batteries. As illustrated in Fig. 1, the batteries extend well forwardly toward the chassis, and a great part of the weight of the batteries is put on the driving wheels to insure the necessary traction friction. The batteries as accommodated are also amply protected from both the exterior and from the interior of the vehicle, while at the same time, by merely lifting the lids to the battery compartments all the batteries can be quickly inspected. The rear part of the vehicle body is preferably supported on ordinary wheels 135 having the ordinary metallic tires 136. Such wheels will greatly reduce the initial cost of the vehicle and also the cost of repairs. In fact, the body and rear wheel mechanism can be substantially the same as that of ordinary horse drawn vehicles, and in many cases it is practicable to merely substitute my power driven chassis for the ordinary front wheel mechanism.

I thus provide a vehicle in which the propulsion chassis is of simple and strong and durable construction and which at the same time is capable of furnishing adequate power for propelling vehicles under heavy load and for automatically controlling turning and other maneuvering of the vehicle without any physical exertion on the part of the operator. The pivotal connection of the strong chassis main supporting frame with both sides of each wheel eliminates all tendency to inclination or distortion of the driving wheels and keeps the weight evenly distributed on the wheels, which are therefore at all times in perfect balance and thereby enabled to most efficiently perform their functions. The arrangement for accommodating the storage batteries affords ample protection, and the batteries may be inspected at any time without disturbance thereof. The particular arrangement of the batteries also give a more desirable distribution of their weight over the vehicle.

I do not of course desire to be limited to the precise constructions, arrangements, and operations shown and described, as changes and modifications are of course possible which would still come within the scope of the invention, and I therefore claim the following:

1. In a power driven vehicle, a truck comprising a main rigid supporting frame, wheels for said truck each having an independent axle and the end of each axle being independently journaled on said frame whereby a load on the vehicle is equally distributed on the wheel axles whereby said wheels are always maintained in perfect vertical position, an annular swivel frame secured to said main supporting frame, a second annular frame concentric with said swivel frame and secured to the vehicle, and means supported by said second annular frame for controlling the swiveling of said swiveling frame and thereby bodily turning of said main supporting frame.

2. In a power driven vehicle, the combination of wheels for supporting one end of the vehicle body, a steering truck for supporting the other end of said body, said truck comprising a main supporting frame having side compartments, a wheel at each side compartment pivoted at both its sides to said frame whereby said load on the frame is evenly distributed at the sides of the wheels, a swivel member secured to said frame, a companion swivel member secured to the vehicle body, steering means controlled directly by the operator for effecting rotation of said truck, a driving motor within each truck wheel, and means controllable by the operator for effecting operation of said driving motors to drive the wheels to effect turning of the truck independently of physical exertion on the part of the operator.

3. In a power driven vehicle, the combination of the vehicle body, an annular structure secured to the vehicle body and having a lower swivel end, a companion annular swivel member engaging said lower end to rotate about said end, front and rear extensions and side extensions on said companion swivel member, a semi-elliptical spring secured at its center to the front and rear extensions, a semi-elliptical spring secured at its middle to each of the side extensions, said springs being at right angles with each other and over-lapping at their ends, a truck frame, wheels pivoted to said truck frame, the ends of said springs being confined to individual sliding engagement with said truck frame, and means controlled by the operator of the vehicle for effecting turning of said companion swivel member, such turning being communicated through the springs to the truck frame whereby the vehicle is steered.

4. In a power driven vehicle, the combination of a vehicle body, an annular frame secured to the body having an annular lower swivel end, a companion annular swivel member encircling said lower end, a truck frame connected with said companion swivel member and having swiveling wheels, a shaft journaled on said annular frame and having a sprocket wheel, a chain engaging said sprocket wheel and encircling said companion annular member, a second sprocket wheel on said shaft, a steering shaft having a steering wheel for the operator of the vehicle, said steering shaft having a sprocket wheel, and a chain engaging said steering shaft sprocket wheel and said second sprocket wheel on said first mentioned shaft whereby turning of the steering wheel will cause rotation of the companion swivel member and thereby turning of the truck frame on said wheels.

5. In a power driven vehicle, the combination of a vehicle body, an annular frame secured to the body having an annular lower swivel end, a companion annular swivel member encircling said lower end, a truck frame connected with said companion swivel member and having swiveling wheels, a shaft journaled on said annular frame and having a sprocket wheel, a chain engaging said sprocket wheel and encircling said companion annular member, a second sprocket wheel on said shaft, a steering shaft having a steering wheel for the operator of the vehicle, said steering shaft having a sprocket wheel, a chain engaging said steering shaft sprocket wheel and said second sprocket wheel on said first mentioned shaft whereby turning of the steering wheel will cause rotation of the companion swivel member and thereby turning of the truck frame on said wheels, an individual driving motor for each wheel, a source of current carried by the vehicle, circuits for connecting said source with said wheel motors, and circuit controlling mechanism adjustable by the operator to vary the relative current supply of the motors whereby said wheels may be driven relatively to have relatively different propulsion power whereby turning of the truck and steering of the vehicle may be accomplished slowly by the wheels themselves.

6. In a power driven vehicle, the combination of a vehicle body, a swivel frame secured to the body, a companion swivel member encircling the lower end of said swivel frame, a truck frame having supporting wheels, longitudinal and transverse semi-elliptical springs secured to said companion swivel member, the ends of said springs having slidable engagement with said truck frame, studs extending downwardly from said companion swivel member and having slidable engagement with said truck frame and serving to prevent lateral displacement of the companion swivel member with reference to the truck frame, and means controllable by the operator of the vehicle for effecting turning of said companion swivel member, such turning being communicated to the truck frame through the springs.

7. In a power driven vehicle, a truck comprising a main rigid supporting frame, wheels for said truck each having an independent axle and the end of each axle being independently journaled on said frame whereby a load on the vehicle is equally distributed on the wheel axles whereby said wheels are always maintained in perfect vertical position, an annular swivel frame secured to said main supporting frame, a second annular frame concentric with said swivel frame and secured to the vehicle, means supported by said second annular frame for controlling the swiveling of said swiveling frame and thereby bodily turning of said main supporting frame, and a driving motor within each of said wheels.

8. In a steering truck for power driven vehicles the combination of a rectangular frame having transverse and longitudinal walls, intermediate longitudinal walls adjacent the side walls and secured to the transverse walls to form with said rectangular frame a rigid truck frame and to form with the side walls of said rectangular frame compartments for accommodating wheels, a wheel in each compartment having an axle, one end of which is journaled to the adjacent side wall and whose other end is journaled to the adjacent intermediate wall of the truck frame, an annular swivel member mounted centrally on said truck frame, a second annular member concentric with said swiveling member and adapted to be secured to a vehicle to be supported by the truck, mechanism mounted on said second annular frame and engaging with said swiveling frame and controllable to effect turning of said swivel frame and thereby turning of said truck frame.

9. In a steering truck for power driven vehicles, the combination of a main rectangular frame having side and transverse walls, intermediate longitudinal walls extending between said transverse walls adjacent said side walls to form wheel compartments with said side walls, said walls together forming a rigid supporting frame, a wheel in each compartment having an axle whose outer end is journaled to the adjacent side wall and whose inner end is journaled to the adjacent intermediate wall, transverse and longitudinal semielliptical springs each of whose ends has slidable engagement with said supporting frame, an annular member to which the center of each spring is rigidly secured, a second annular member having swiveling engagement with said first mentioned annular member and adapted to be secured to a vehicle to be supported, and means supported on said second mentioned annular member and adapted to be operated to cause rotation of said first mentioned annular member and thereby rotation of said rigid supporting frame.

10. In a steering and driving truck frame for power driven vehicles, the combination of a rigid rectangular main supporting frame, a wheel structure at each end of said frame, each wheel structure having an axle each of whose ends is independently journaled to said supporting frame whereby a load on said supporting frame is evenly distributed at the sides of the wheels and said wheels thereby prevented from displacement from vertical position, an independent driving motor for each wheel, and means for centrally pivoting said supporting frame to a vehicle to be supported.

11. In a truck for power driven vehicles, the combination of a rectangular frame comprising side and transverse walls and intermediate longitudinal walls extending between the transverse walls adjacent the side walls, said walls forming a rigid main supporting structure, a wheel for each side of the supporting structure, each wheel having an axle journaled at its outer end to the adjacent side wall and journaled at its inner end to the adjacent intermediate wall of the supporting structure whereby a load on said structure is evenly distributed at the sides of the wheels to prevent displacement of the wheels from vertical alinement, supporting plates secured to the supporting structure at the juncture of the intermediate walls and transverse walls thereof, slideways on each plate, transverse and longitudinal semi-elliptical springs each having its ends slidably engaging in opposite slideways, an annular swivel member in which each spring is rigidly secured at its center, a companion annular swivel member concentric with said first mentioned swivel member and secured to the vehicle to be supported, means carried by said second mentioned swivel member and controllable from the vehicle to effect rotation of the first mentioned swivel member and thereby rotation of said supporting structure, and an independent driving motor for each wheel controllable independently from the vehicle.

12. In a power driven vehicle, the combination of a vehicle body, a swivel frame secured to the body, a companion swivel member encircling the lower end of said swivel frame, a steering truck frame having supporting wheels, longitudinal and transverse semi-elliptical springs secured at their centers to said companion swivel member, the ends of said springs being confined to the truck frame but having longitudinal slidable engagement therewith, and means controlled by the operator for causing turning of said companion swivel member, such turning being communicated to the truck frame through the springs.

In witness whereof, I hereunto subscribe my name this 9th day of February, A. D. 1911.

RODERICK MACRAE.

Witnesses:
CHARLES J. SCHMIDT,
NELLIE B. DEARBORN.